March 27, 1951 B. M. HYMAN ET AL 2,546,750
CONVEYER FOR TRACTOR-MOUNTED CORN PICKERS
Original Filed April 11, 1942 2 Sheets-Sheet 1
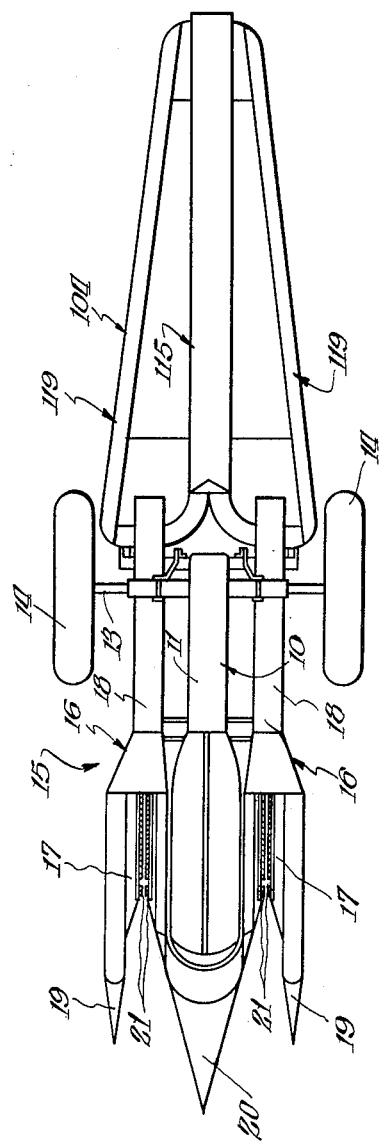
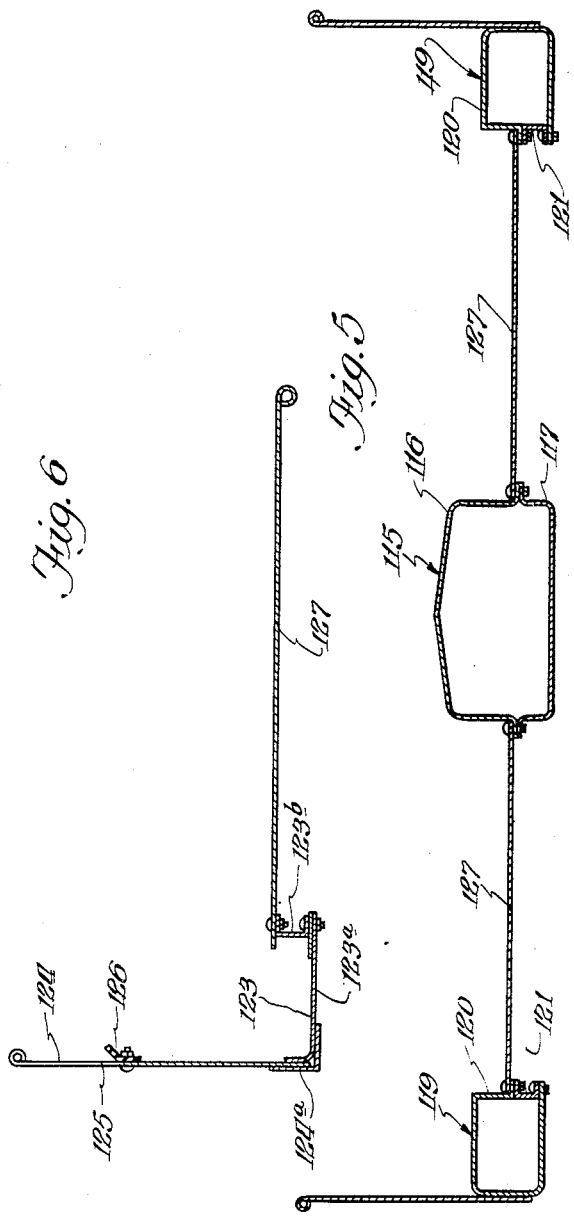
Inventors:
Benjamin M. Hyman
Elof K. Karlsson
By: Paul O. Pippel
Attorney.

March 27, 1951  B. M. HYMAN ET AL  2,546,750
CONVEYER FOR TRACTOR-MOUNTED CORN PICKERS
Original Filed April 11, 1942  2 Sheets-Sheet 2
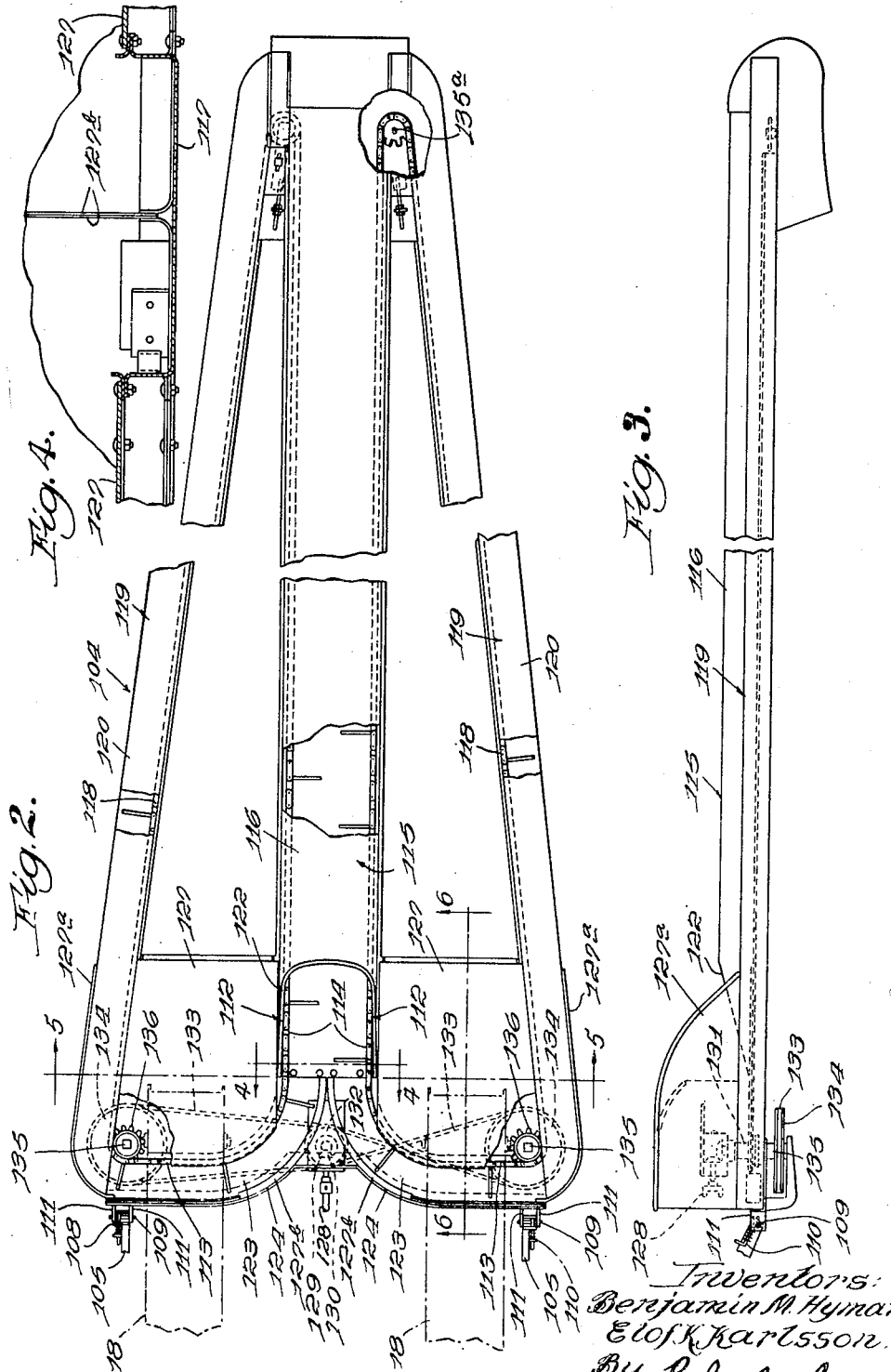

Patented Mar. 27, 1951

2,546,750

UNITED STATES PATENT OFFICE 2,546,750

CONVEYER FOR TRACTOR-MOUNTED CORN PICKERS

Benjamin M. Hyman and Elof K. Karlsson, Moline, Ill., assignors to International Harvester Company, a corporation of New Jersey Original application April 11, 1942, Serial No. 438,582. Divided and this application June 23, 1948, Serial No. 34,777

2 Claims. (Cl. 198—162)

This invention relates to a harvester. More specifically it relates to a tractor-mounted corn picker and is a division of our parent application having Serial No. 438,582, filed April 11, 1942, and now having matured into Patent No. 2,458,782.

Tractor-mounted corn pickers in which corn is conveyed over the rear axle of the tractor by rolls or by conveyors may be somewhat difficult to remove from the tractors. Tractor-mounted corn pickers in which various mechanisms, such as rolls and conveyors, are at a level below the tractor axle and extend beneath the tractor axle may be more easily removed from the tractor. The corn picker of the present invention is of the latter type.

An object of the present invention is to provide an improved harvester.

A further object is the provision of an improved corn picker.

Another object is to provide an improved tractor-mounted harvester.

Another object is the provision of an improved conveying means.

Still another object is to provide an improved wagon elevator for the corn picker.

A still further important object of this invention is to provide a wagon elevator to be carried at the rear of a tractor and including means to feed material transversely at the rear of the tractor prior to upward and rearward elevation of the material.

Still another object is to provide a triangular shaped elevator conveyor in combination with a tractor-mounted picker in which the picker unit is carried beneath the rear axle of the tractor.

According to the present invention, a corn harvester comprising two picking units is mounted upon a tractor with the picking units at opposite sides thereof and extending beneath the rear axle. The picking units are pivotally mounted upon a transverse member secured behind and to the tractor axle. A wagon elevator is mounted upon the transverse member and includes two conveyor loops which convey corn ears from the picking units to the tractor center line and along the center line to a wagon connected at the rear of the tractor.

In the drawings:

Figure 1 is a plan view showing the novel corn picker of the present invention mounted upon a tractor;

Figure 2 is a plan view of the novel wagon elevator used with the corn picker of the present invention;

Figure 3 is a side view of the wagon elevator;

Figure 4 is a sectional view taken along the lines 4—4 of Figure 2;

Figure 5 is a sectional view taken along the lines 5—5 of Figure 2; and

Figure 6 is a sectional view taken along the lines 6—6 of Figure 2.

The reference character 10 designates a tractor which includes a narrow longitudinally extending body 11, a narrow front truck 12, a transversely extending rear axle 13, and rear wheels 14 at the ends of the axle 13. Upon the tractor 10 is mounted a corn harvester designated generally by the reference character 15. The corn harvester comprises two picking units 16, one at each side of the tractor body 11 and each comprising a snapping unit 17 and a husking unit 18. Gather points 19 are connected to the front of the snapping units 17, and a central gather point 20 embraces the front of the tractor body 11. Each snapping unit includes a pair of snapping rolls 21.

A corn picker of the present invention also includes a wagon elevator 104 for transferring corn ears from the husking units 18 to the wagon. As will be seen from Figure 2, the wagon elevator 104 comprises essentially two conveyor loops 112, each of which has a transversely extending first portion 113 extending from a first point at the rear of one picker unit to a second point adjacent the longitudinal centerline of the tractor and a longitudinally extending second portion 114 extending rearwardly from the second point and upwardly along the longitudinal centerline of the tractor to a third point rearwardly of the tractor. The longitudinally extending portions 114 pass through and along opposite sides of a central tubular housing 115 formed, as indicated in Figure 11, of channel sections 116 and 117. Each conveyor loop 112 includes, in addition to the transverse portion 113 and longitudinally extending portion 114, a diagonally extending third portion 118 extending from said third point back to the first point at the rear of the corresponding picker unit which passes through a housing 119 formed, as indicated in Figure 5, of a section 120 and a narrow channel section 121 closing the opening in the section 120. The forward end of the channel section 116 is cut on a slope, as indicated at 122, so that the housing 115 is open at its forward end and exposes the longitudinal portions 114 of the conveyor loops 112. The transverse portions 113 of the conveyor loops are also exposed, being carried in channels 123. As indicated in Figures 3 and 6, each of the channels 123 comprises a member 123a forming one side and a bottom, and a channel member 123b forming the other side. A sheet 124 is secured to the member 123a as an extension to the one side. An angle member 124a reenforces the joint of the members 123a and 124. The sheets 124 are cut out at 125 (Figure 6) for reception of the very rear ends of the picking units 16. The horizontal edges of the cut out portions 125 carry a rubber member 126 acting as a seal upon contact with the rear end of the picking unit 16. Extending between the central housing 115 and the upper housings 119 at their forward ends are sheets 127. Side members 127a extend from the sheets 124 as continuations thereof along the housings 119 as far as the sheets 127 extend. Members 127b extend from the sheets 124 toward one another into tangential contact. The sheets 124 and 127 and members 127a and 127b cooperate to form hoppers for the reception of corn ears as they are delivered from the elevating conveyors 26 of the housing units 18.

The channels 123 form the base portion of a triangular frame work which includes the rearwardly extending housings 119 which form an apex. The third tubular section 115 extends from a midpoint at the base of the triangular frame work to the apex thereof.

The conveyor loops 112 of the wagon elevator 104 are driven by a shaft 128 which imparts rotation to a bevel gear 129 meshing with the bevel gear 130. The bevel gear 130 is carried on a shaft 131, the lower end of which carries pulleys 132. Belts 133 connect the pulleys 132 and pulleys 134 mounted upon shafts 135 positioned at the sides of the wagon elevator 104. Sprockets 136 upon the shafts 135 drive the conveyor loops 112.

As best shown by the broken-away section at the right end of Figure 2, the conveyor chains 114 and 118 at the rearward ends where they join together pass over a supporting sprocket 135a. This sprocket together with the corresponding sprocket 136 carry the conveyor structure within the surrounding structure in which the conveyor operates.

In operation, the tractor 10 is driven through a field of corn with adjacent rows of corn passing between the sets of snapping rolls 21. Corn ears are snapped by the rolls 21 and are conveyed rearwardly to the husking units 18. The husked ears are delivered from the rear end of the husking units into the wagon elevator. Transverse portions 113 of the conveyor loops 112 move the ears transversely to the center line of the tractor, and thence the ears are moved upwardly and rearwardly along the tractor center line by portions 114 of the conveyor loops 112 and are dumped into a trailing wagon.

Since the husking units 18 pass beneath the tractor axle 13, the picking units may be removed from the tractor with comparative ease, since the units need be lowered to the ground only a short distance upon detachment from the tractor. The wagon elevator 104 is not only believed to be new as a conveying means, but is also novel in relation to the particular picking units with which it is used. Since the picking units extend beneath the tractor axle, the corn ears are discharged from the units at a lower level than they would be if the units extended over the axle. Thus, it would be difficult to move the ears transversely from the ends of the picking units to the longitudinal center line of the tractor for conveying to the wagon, by means of ordinary gravity chutes. Consequently, a positive conveying means for moving the corn transversely is of great advantage, and a transverse conveying means for moving ears from the picking units to the tractor center line and a longitudinal conveying means for moving ears along the longitudinal center line to the wagon are combined in one in the conveying loops 112 forming the essential parts of the novel wagon elevator 104.

The intention is to limit the invention only within the scope of the appended claims.

What is claimed is:

1. A conveying device of triangular shape comprising first and second tubular sections forming two sides of the triangle, open channel means forming the third side of the triangle, a third tubular section extending from a midpoint of the open channel means to the corner of the triangle formed by the meeting of the first and second tubular sections, a first conveyor loop extending along the channel means from the first tubular section to the mid-point thereof, thence through the third tubular section to the aforesaid corner of the triangle, and thence through the first tubular section back to the channel means; a second conveyor loop extending from the second tubular section along the channel means to the mid-point thereof, thence through the third tubular section to the said corner of the triangle, and thence through the second tubular section back to the channel means.

2. The conveying device specified in claim 1, and further including closure means extending between the first tubular section, the third tubular section, and the channel means and between the second tubular section, the third tubular section and the channel means so as to close the spaces between the tubular sections adjacent the channel means, and means extending along the outer side of the channel means and the outer sides of the first and second tubular sections adjacent the channels so as to form a high retaining wall, the closure means and the retaining wall forming with the channel means a reservoir for an excess of material adapted to be received by the conveyor loops in the open channels and to be conveyed by the conveyor loops through the third tubular section.

BENJAMIN M. HYMAN.
ELOF K. KARLSSON.

REFERENCES CITED

The following references are of record in the file of this patent:

UNITED STATES PATENTS

| Number | Name | Date |
| --- | --- | --- |
| 2,134,867 | Fergason | Nov. 1, 1938 |
| 2,293,757 | Jochumsen | Aug. 25, 1942 |

FOREIGN PATENTS

| Number | Country | Date |
| --- | --- | --- |
| 482,335 | Germany | Sept. 11, 1929 |